(12) United States Patent
Kim

(10) Patent No.: US 7,859,613 B2
(45) Date of Patent: Dec. 28, 2010

(54) LIQUID CRYSTAL DISPLAY DEVICE HAVING A LIGHT SOURCE DISPOSED ON A LATERAL SIDE OF A LIGHT GUIDE PLATE

(75) Inventor: Jong-Hyeok Kim, Gyeongsangbuk-Do (KR)

(73) Assignee: LG Display Co., Ltd., Seoul (KR)

( * ) Notice: Subject to any disclaimer, the term of this patent is extended or adjusted under 35 U.S.C. 154(b) by 234 days.

(21) Appl. No.: 11/822,154

(22) Filed: Jul. 2, 2007

(65) Prior Publication Data
US 2008/0094542 A1 Apr. 24, 2008

(30) Foreign Application Priority Data
Oct. 23, 2006 (KR) ...................... 10-2006-0103165

(51) Int. Cl.
*G02F 1/1335* (2006.01)
*F21V 7/04* (2006.01)
(52) U.S. Cl. ............................. 349/65; 349/70; 362/614
(58) Field of Classification Search .................. 362/630, 362/631; 349/70, 67
See application file for complete search history.

(56) References Cited

U.S. PATENT DOCUMENTS

| 6,692,313 | B1 * | 2/2004 | Tomasino ............... | 439/791 |
| 6,984,056 | B2 * | 1/2006 | Amano et al. ........... | 362/225 |
| 2005/0226002 | A1 * | 10/2005 | Aoki et al. ............... | 362/581 |
| 2006/0139963 | A1 * | 6/2006 | Chang et al. ............ | 362/633 |

FOREIGN PATENT DOCUMENTS

CN 1489178 4/2004

\* cited by examiner

*Primary Examiner*—David Nelms
*Assistant Examiner*—Paul C Lee
(74) *Attorney, Agent, or Firm*—McKenna Long & Aldridge LLP

(57) ABSTRACT

The present invention relates to a liquid crystal display device connecting between an inverter and a lamp without a solder, the liquid crystal display device comprising a liquid crystal display panel; a light source providing light to the rear of the liquid crystal display panel, and comprising a light source body in the shape of the column and a light source electrode disposed at the both ends of the light source body; an inverter providing power for the light source; a light source wire connecting between the inverter and the light source electrode, and having a connecting terminal ring-shaped at the one end; an electric conduction terminal having an electrode inserting cavity for accommodating the light source electrode at the one end and a coupling cavity for coupling with a coupling means passing through the connecting terminal ring-shaped at the other end; and a coupling member having a electric conduction terminal accommodating hole exposing the electrode inserting cavity and the coupling cavity of the electric conduction terminal by accommodating the electric conduction terminal. Thus, the present invention provides a liquid crystal display device enhanced the production and efficiency on the assembly process.

8 Claims, 8 Drawing Sheets

LIQUID CRYSTAL DISPLAY DEVICE HAVING A LIGHT SOURCE DISPOSED ON A LATERAL SIDE OF A LIGHT GUIDE PLATE

This application claims the benefit of Korean Patent Application No. 2006-103165, filed on Oct. 23, 2006, which is hereby incorporated by reference for all purposes as if fully set forth herein.

BACKGROUND OF THE INVENTION

1. Field of the Invention

The present invention relates to a liquid crystal display device, and more particularly, to a liquid crystal display device connecting between an inverter and a lamp without a solder.

2. Discussion of the Related Art

Recently, flat panel display devices such as liquid crystal display devices, plasma display panels and organic light emitting diode based displays have been developed as substitutes for CRT (cathode ray tube) based displays.

In particular, the liquid crystal display (LCD) device are widely used as the displays of cell phones, portable computers, desktop monitors and liquid crystal televisions because of the high contrast ratio, low power consumption and suitability for displaying moving images that are characteristics of LCD devices.

Generally, a liquid crystal display device includes a liquid crystal display panel and a backlight unit. The liquid crystal display panel includes a thin film transistor substrate, a color filter substrate and a liquid crystal layer sandwiched between the thin film transistor substrate and the color filter substrate. The backlight unit is disposed at the rear of the liquid crystal display panel to provide light to the rear surface of the thin film transistor substrate. A backlight unit is provided because the liquid crystal display panel is not a self-illuminating device.

Backlight units may be broadly classified as edge type and direct type units according to the position of the light source relative to the liquid crystal display panel. The edge type backlight unit is most often employed in smaller sized the liquid crystal display such as those used in cell phones, notebook personal computers, and desktop monitors, while the direct type backlight unit is more typically employed in larger sized liquid crystal display devices such as liquid crystal televisions.

FIG. 1 illustrates a liquid crystal display with a typical edge type backlight unit. The liquid crystal display device 1 includes a liquid crystal display panel 10, a light guide plate 20 disposed at the rear of the liquid crystal display panel 10, and a light source 30 disposed at one side of the light guide plate 20. The liquid crystal display panel 10 includes a thin film transistor substrate 11 and a color filter substrate 12. Light emitted by the light source 30 enters at the one side of the light guide plate 20 and exits the light guide plate 20 at a surface at the rear of the liquid crystal display panel 10. A diffusion sheet, a prism sheet and a protection sheet 15, 16, and 17 are provided between the liquid crystal display panel 10 and the light guide plate 20. A reflective sheet 40 is disposed between the light guide plate 20 and a lower cover 50. A light source reflector 37 partially surrounds the light source 30. Light emitted by the light source 30 is reflected by the light source reflector 37 to enter a side surface of the light guide plate 20.

A CCFL (cold cathode fluorescent lamp), a HCFL (hot cathode fluorescent lamp) and an EEFL (external electrode fluorescent lamp) may each be employed as the light source 30 of the liquid crystal display device 1. As shown in FIG. 2, a CCFL, HCFL or EEFL for use as the light source 30 typically includes a cylindrically shaped glass tube 31, lamp electrodes 32 provided on each of the ends of the glass tube 31, and a lamp wire 33 connected between an inverter 34 and the lamp electrodes 32. An inverter 34 is connected to the lamp electrodes 32 through connector 35, and the lamp wire 33 is connected to the lamp electrodes 32 using solder.

However, the soldering process for connecting the lamp wire 33 to the lamp electrodes 32 uses a series of steps such as disposing the lamp wire 33 adjacent to the lamp electrodes 32, applying solder to the lamp wire 33 and the lamp electrode 32, and applying heat to the solder for connection between the lamp wire 33 and the lamp electrode 32. Accordingly, the soldering process uses a long time, thereby increasing production time and reducing the efficiency of the assembly process. Moreover, a malfunction causing contaminant may be introduced during the soldering process. Finally, an impact may separate the solder from the lamp wire 33 and the lamp electrode 32.

SUMMARY OF THE INVENTION

Accordingly, the present invention is directed to a liquid crystal display device that substantially obviates one or more of the problems due to limitations and disadvantages of the related art.

An advantage of the present invention is to provide a liquid crystal display device capable of connecting between an inverter and a lamp without using solder.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device is provided including: a liquid crystal display panel; a light source providing light to the rear of the liquid crystal display panel, and comprising a light source body in the shape of the column and a light source electrode disposed at the both ends of the light source body; an inverter providing power for the light source; a light source wire connecting between the inverter and the light source electrode, and having a connecting terminal ring-shaped at the one end; an electric conduction terminal having an electrode inserting cavity for accommodating the light source electrode at the one end and a coupling cavity for coupling with a coupling means passing through the connecting terminal ring-shaped at the other end; and a coupling member having a electric conduction terminal accommodating hole exposing the electrode inserting cavity and the coupling cavity of the electric conduction terminal by accommodating the electric conduction terminal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

Figure 1:
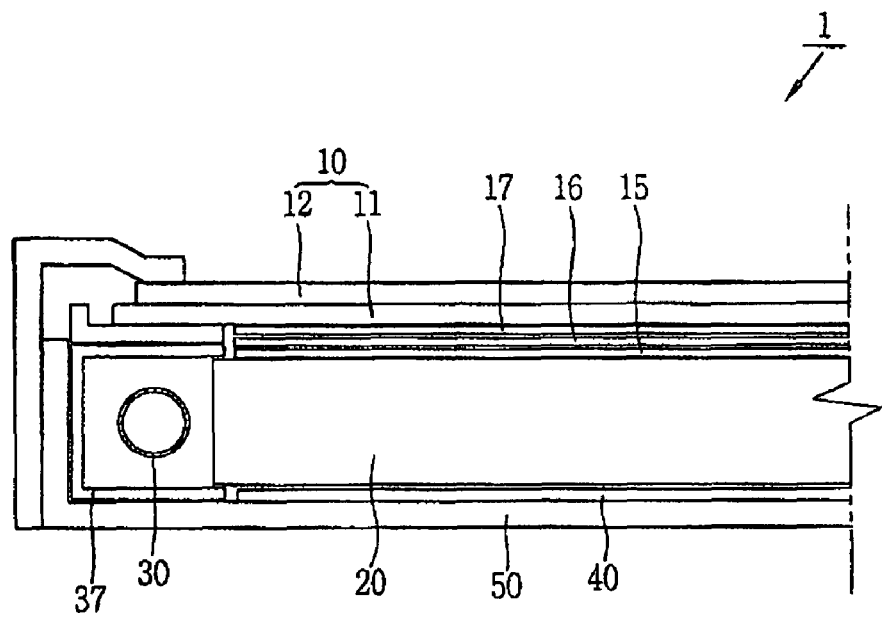
FIG. 1 is a sectional view of a liquid crystal display device according to the related art.
Figure 2:
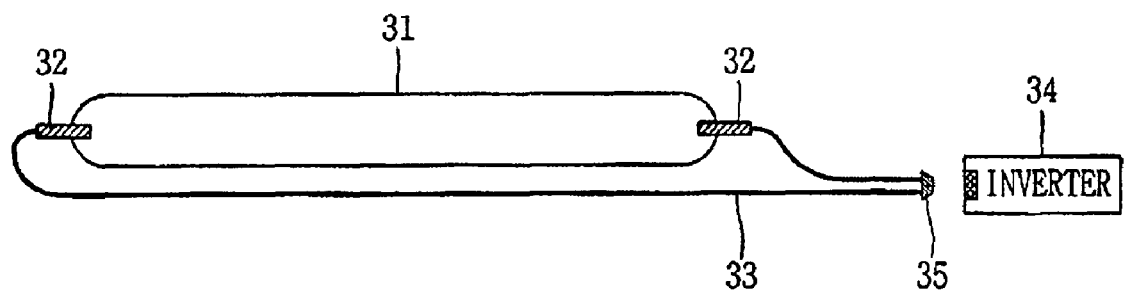
FIG. 2 is a schematic view illustrating the connection between a light source and an inverter applied to the liquid crystal display device according to the related art.
Figure 3:
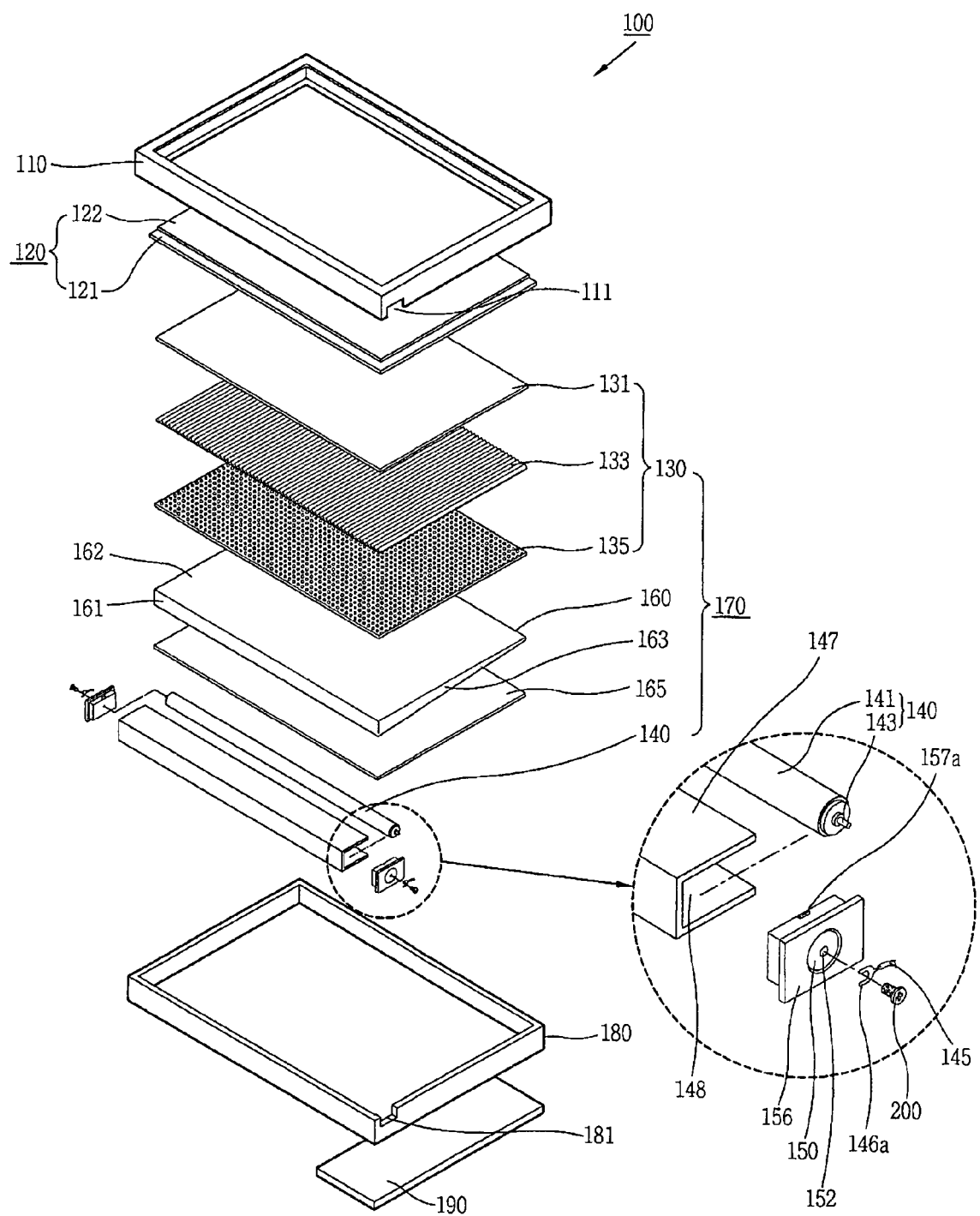
FIG. 3 is a partial exploded perspective view of a liquid crystal display device according to an embodiment of the present invention.

FIG. 3 illustrates a liquid crystal display device according to an embodiment of the present invention employing a connection between a light source and an inverter employing an edge type backlight unit.

As shown in FIG. 3, the liquid crystal display device 100 includes a liquid crystal display panel 120 for displaying an image, a driver integrated circuit that drives the liquid crystal display panel 120, a backlight unit 170 that provides light to the rear of the liquid crystal display panel 120, a lower cover 180 that accommodates the backlight unit 170, an upper cover 110 that covers the rim of the liquid crystal display panel 120 and couples with the lower cover 180, and an inverter 190 disposed at the rear of the lower cover 180.

Figure 7:
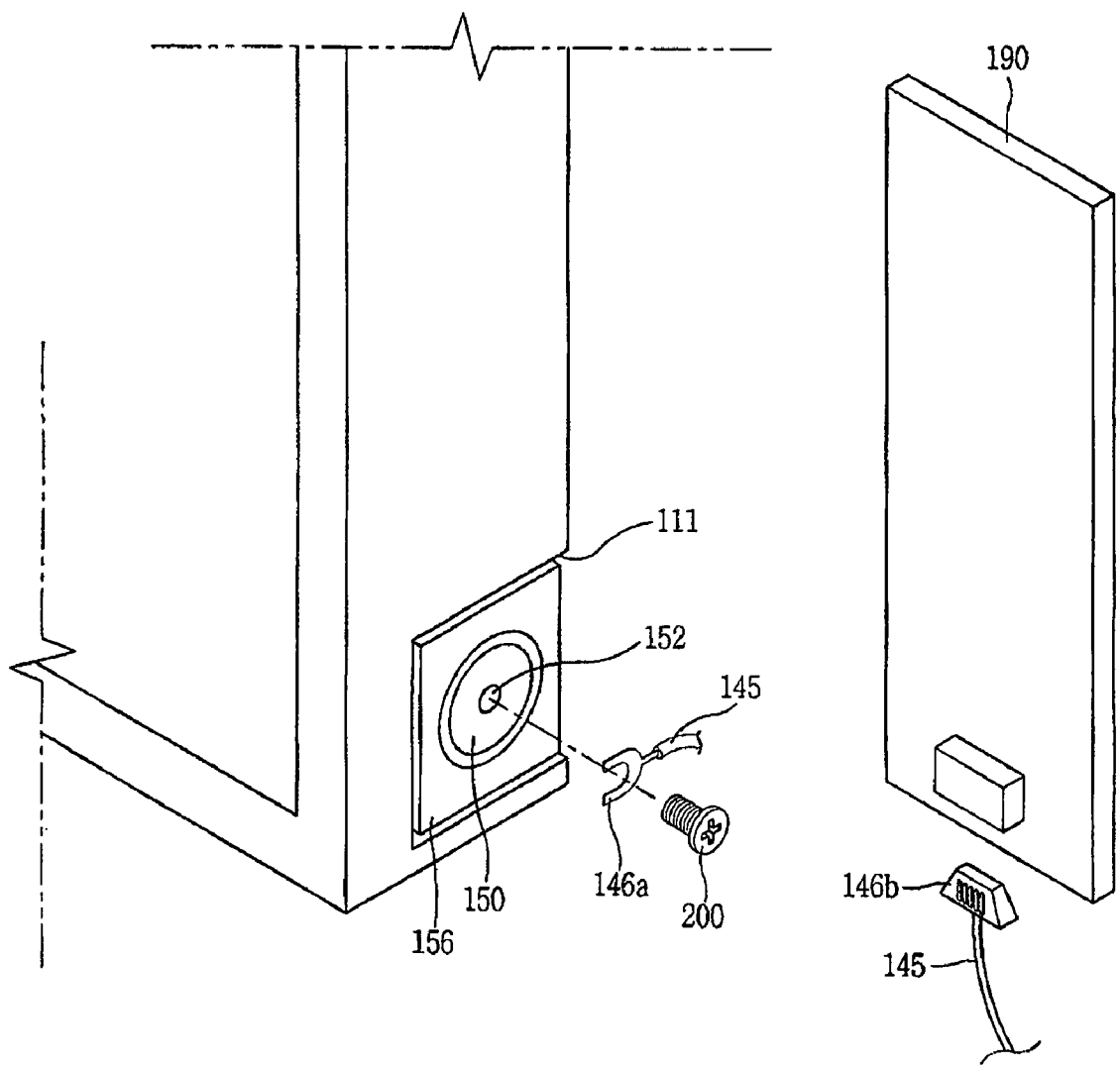
FIG. 7 is a schematic view illustrating the connection between the light source and the inverter applied to a liquid crystal display device according to an embodiment of the present invention.

The upper cover 110 covers the rim of the liquid crystal display panel 120 and exposes the display area of the liquid crystal display panel 120. The upper cover 110 includes at least one of hook for coupling with the lower cover 180 on the side and an upper cover exposing hole 111 exposing at least one part of a coupling member 156 and an electric conduction terminal 150. The upper cover exposing hole 111 is provided on a side of the upper cover 110. As shown in FIG. 7, a coupling cavity 152 of the coupling member 156 is exposed through the upper cover exposing hole 111. The coupling cavity 152 is connected to a light source wire 145 connected to the inverter 190 through a coupling means 200. The upper cover 110 is coupled with the lower cover 180, and accommodates the liquid crystal display panel 120 and the backlight unit 170 in the interior space formed by the upper cover 110 and the lower cover 180.

The liquid crystal display panel 120 includes a thin film transistor substrate 121, a color filter substrate 122 aligned to and adhered to the thin film transistor substrate 121, and a liquid crystal layer (not shown) sandwiched between the thin film transistor substrate 121 and the color filter substrate 122. The liquid crystal display panel 120 further comprises a polarizer (not shown) disposed on the rear of the thin film transistor substrate 121 and the front of the color filter substrate 122 for polarizing light transmitted from the liquid crystal display panel 120. Generally, the liquid crystal display panel 120 has a plurality of the liquid crystal cells arranged in matrix formation and consisted of the pixel units, and displays an image through controlling the light transmittance of a liquid crystal cell according to the image signal from the driver integrated circuit (not shown).

Gate lines and data lines are provided on the thin film transistor substrate 121 in matrix formation. A thin film transistor (TFT) is formed at a crossed area of gate lines and data lines. Voltages from the driver integrated circuit are supplied for a pixel electrode on the thin film transistor substrate 121 through the thin film transistor and a common electrode on the color filter substrate 122, and the liquid crystal molecules in the liquid crystal layer are aligned according to the electric field formed between the pixel electrode and the common electrode, thereby controlling the transmittance.

The color filter substrate 122 comprises a black matrix, a color filter alternating red, green and blue (RGB) with the black matrix therebetween, and the common electrode formed on the black matrix and the color filter. The common electrode is made of transparent conductive material like ITO (indium Tin Oxide) or IZO (Indium Zinc Oxide).

The driver integrated circuit (not shown) has a terminal for connecting electrically to the one end of gate lines and data lines elongated from a display area to a non-display area, and provided on the non-display area of the thin film transistor substrate 121.

As shown in FIG. 3, the backlight unit 170 comprises optical sheets 130 located under the liquid crystal display panel 120, the light source 140 providing light to the liquid crystal display panel 120 through the optical sheets 130, a light guide plate 160, and a reflective sheet 165. A light guide plate 160 is inducing light from the light source 140 to the rear of the liquid crystal display panel 120, and the reflective sheet 165 is disposed between the light guide plate 160 and the lower cover 180 and reflects light from the light source 140 to the rear of the liquid crystal display panel 120.

Optical sheets 130 comprise a protection sheet 131, a prism sheet 133, and a diffusion sheet 135 disposed in order. The diffusion sheet 135 comprises a base plate, and a coating layer formed on the base plate. The coating layer includes particles and polymer material that particles dispersed therein. The diffusion sheet 135 diffuses light from the light source 150 and provides light diffused for the liquid crystal display panel 120. The diffusion sheet 135 may be used in a pair or triplicate. The prism sheet 133 comprises a plurality of triangular prisms arranged regularly. The prism sheet 133 concentrates light diffused through the diffusion sheet 135 and provides the light perpendicularly to the plane of the liquid crystal display panel 120. The prism sheet 133 may be used in a pair, and a triangular prism of the prism sheet 133 is made in a predetermined angle. Light passing through the prism sheet 133 goes almost perpendicularly, and the luminance profile of the light is uniformed. The protection sheet 131 disposed on the top prevents the prism sheet from scratches.

The light source 140 comprises a light source body 141 generating light, a light source electrode 143 disposed at each of the two ends of the light source body 141, and a light source wire connecting between the inverter 190 and the light source electrode 143. The light source 140 is supplied with power from the inverter 190 through the light source wire 145, thereby being driven. The light source 140 further comprises a light source reflector 147 covering a part of the circumference of the light source body 141.

The light source body 141 is disposed along the one side of the light guide plate 160. However, even though not shown, the light source 140 may be disposed at each of the two sides of the light guide plate 160. Generally, a CCFL (cold cathode fluorescent lamp) is employed as the light source 140. However, an EEFL (external electrode fluorescent lamp) having benefits of high luminance, low cost, low power consumption, and drivable using a single inverter 190 may be employed as the light source 140. Moreover, a LED (light emitting diode) having high luminance and color reproduction and a HCFL (hot cathode fluorescent lamp) may be employed as the light source 140.

Figure 6A:
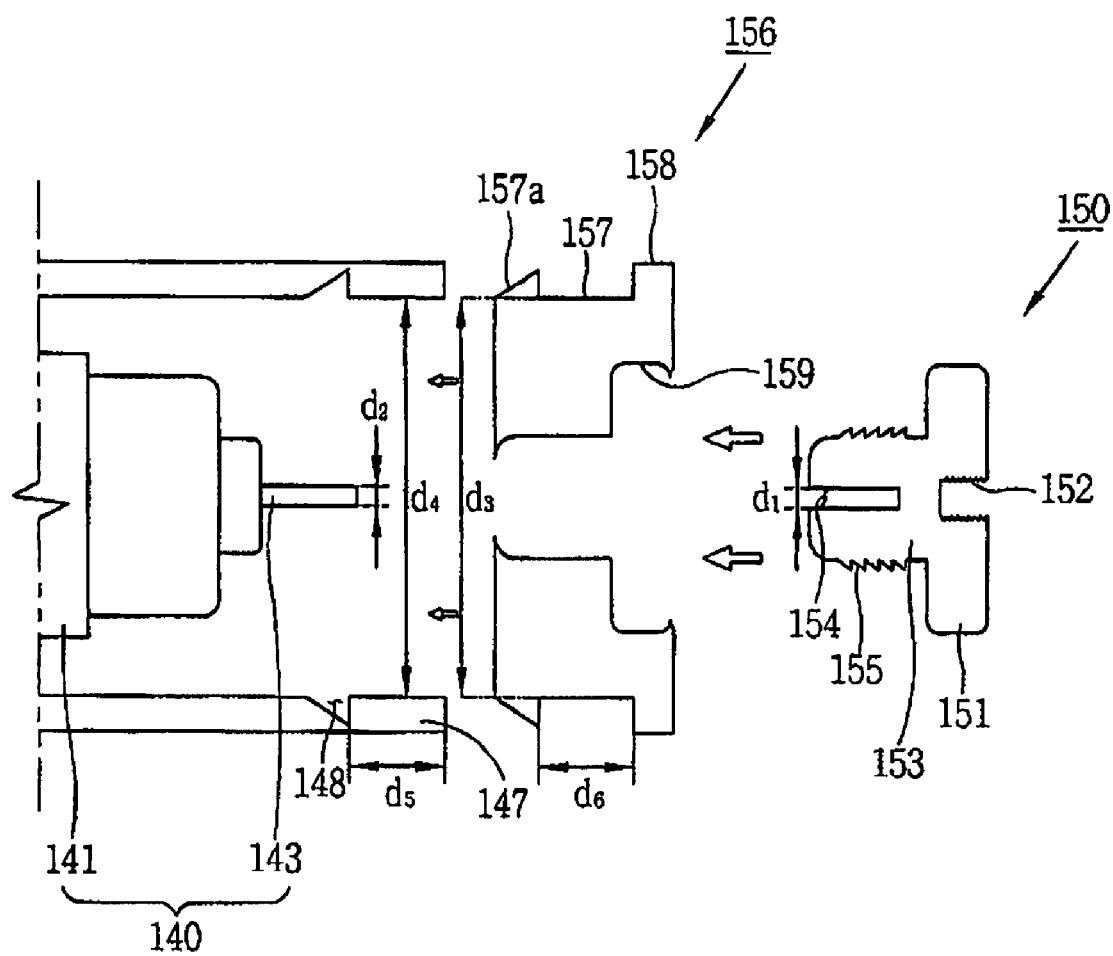
FIGS. 6A and 6B are a sectional view illustrating a method for assembling a backlight unit according to an embodiment of the present invention.
Figure 6B:
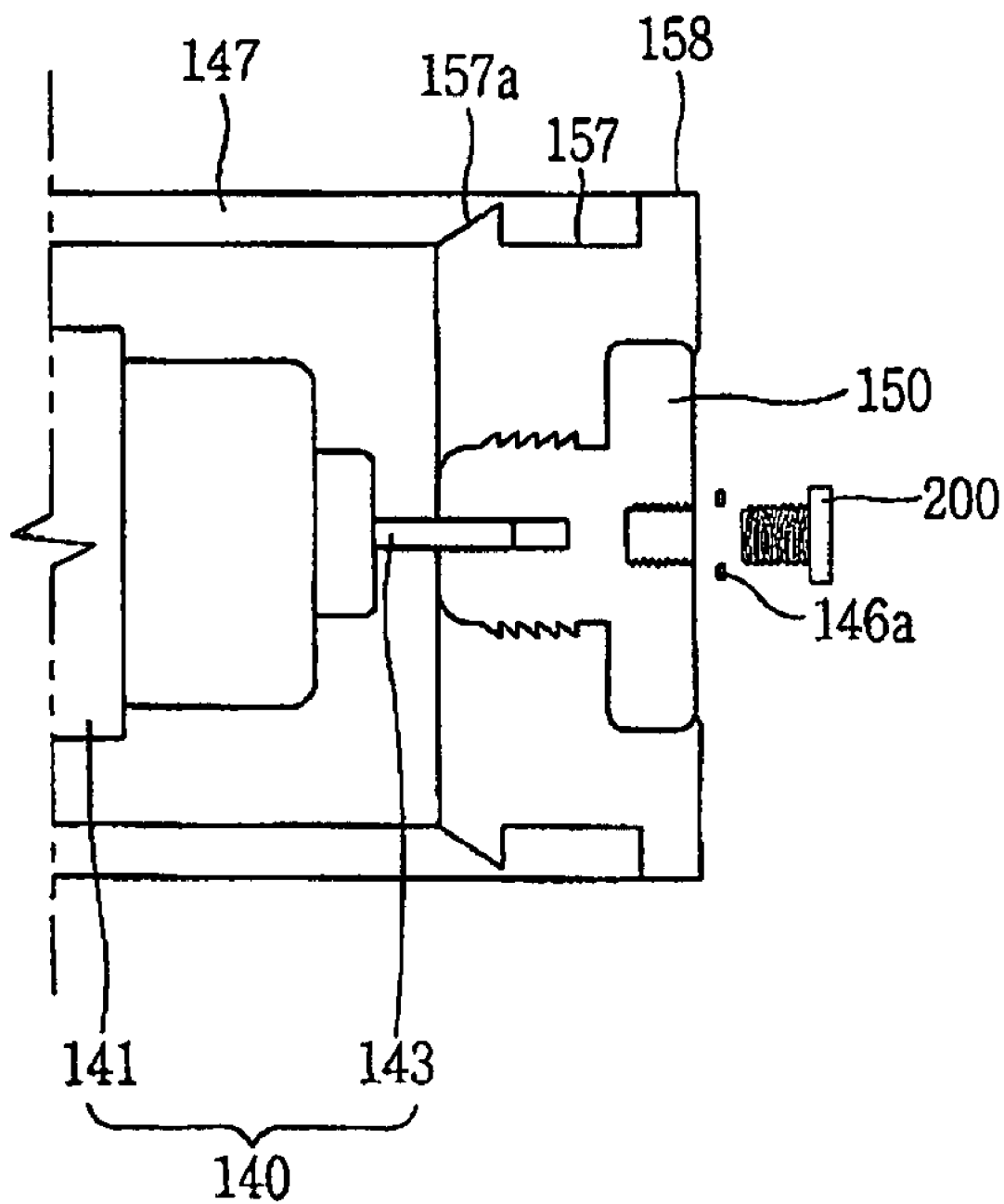

The light source electrode 143 is formed in the shape of the protrusion at both ends of the light source body 141. As shown in FIG. 3 and FIG. 7, the light source wire 145 has a connecting terminal 146a with a ring shaped portion at one end and a connector 146b for connecting to the inverter 190 at the opposite other end. The connecting terminal 146a is conductive. As shown in FIG. 6A and FIG. 6B, a coupling means 200 such as a screw is inserted into the ring-shape of the connecting terminal 146a. The coupling means 200 is also conductive. A coupling means 200 inserted to the ring-shape portion of connecting terminal 146a is connected to a coupling cavity 152, thereby being connected between the light source wire 145 and the light source electrode 143.

The light source reflector 147 is disposed along the length of the light source body 141 and overlaps a part of the circumference of the light source body 141. Material comprising a silver or Aluminum is coated on the inside of the light source reflector 147, thereby reflecting light of the light source 140 to the one side (the entering side 161) of the light guide plate 160. As shown FIG. 6A, a first coupling part 148 dent-shaped is provided on the inside of the light source reflector 147 at the one end. As shown in FIG. 6B, a first coupling part 148 is coupled with a second coupling part 157a. The second coupling part 157a is projected from the surface of the coupling member 156. On the other hand, even though not shown, the first coupling part 148 may be projected and the second coupling part 157a may be dented for coupling each other.

Figure 4:
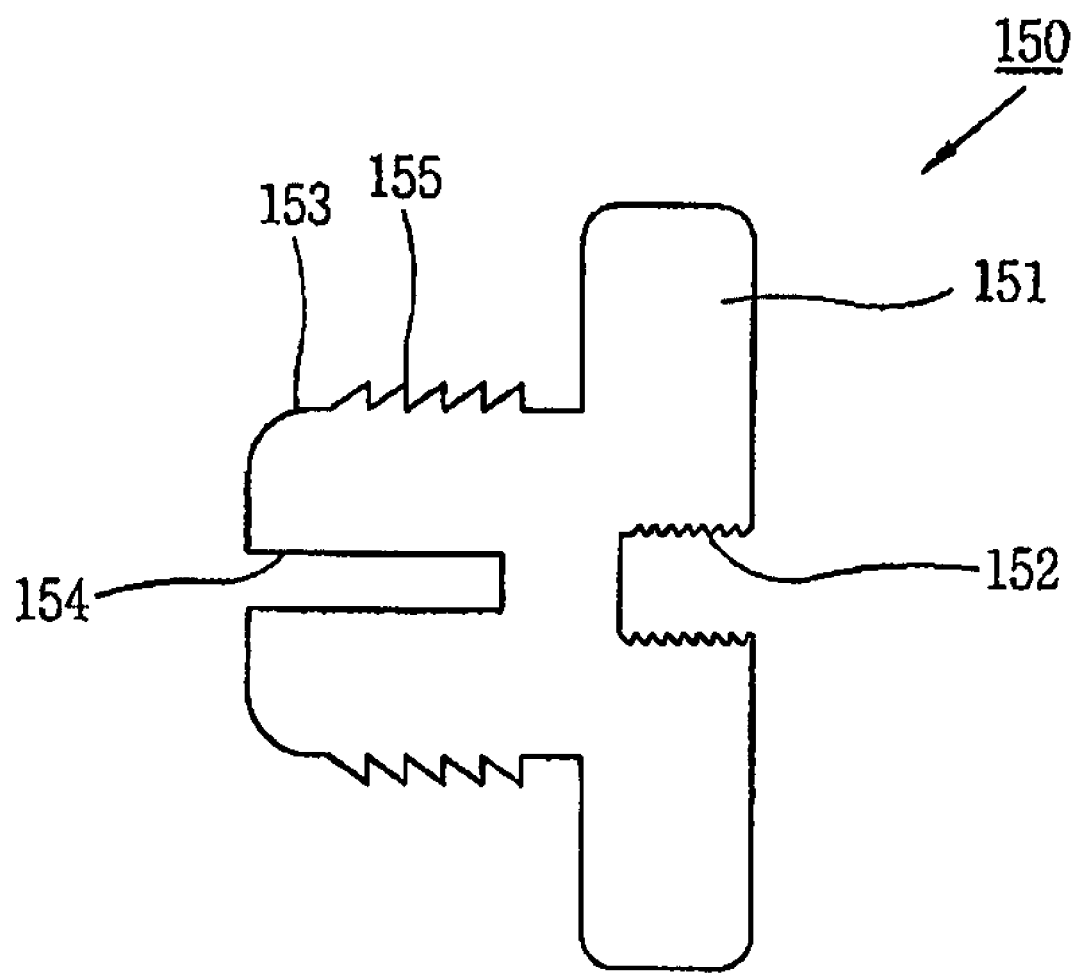
FIG. 4 is a sectional view showing an electric conduction terminal according to an embodiment of the present invention.

The light source electrode 143 is inserted into the electric conduction terminal 150. As shown in FIG. 4, the electric conduction terminal 150 has a T-shaped section. The electric conduction terminal 150 comprises a main body 151 and a protrusion 153 projected from the main body 151. The main body 151 comprises the coupling cavity 152 for insertion of the coupling means 200, and the protrusion part 153 comprises an electric inserting cavity 154 for insertion of the light source electrode 143. As shown in FIG. 6A, the a diameter d1 of the electric inserting cavity 154 may be substantially the same as a diameter d2 of the light source electrode 143 for contact between the light source electrode 143 and the electric conduction terminal 150 securely. On the other hand, even though not shown, a screw thread may be provided on the light source electrode 143 and the electric conduction terminal 150 for coupling between the light source electrode 143 and the electric conduction terminal 150 without difficulty. The screw thread may be provided on the outside of the protrusion part 153 for coupling between the protrusion part 153 and the coupling means 200. Moreover, the protrusion part 153 may include a plurality of stoppers 155. The stoppers 155 are formed on the external circumference of the protrusion part 153 for coupling between the coupling member 156 and the protrusion part 153. As shown in FIG. 4, the cross sections of stoppers 155 are tapered to become smaller in the coupling direction to allow coupling without difficulty while preventing disconnection. In other word, stoppers 155 slopes towards the light source reflector 147.

Figure 5:
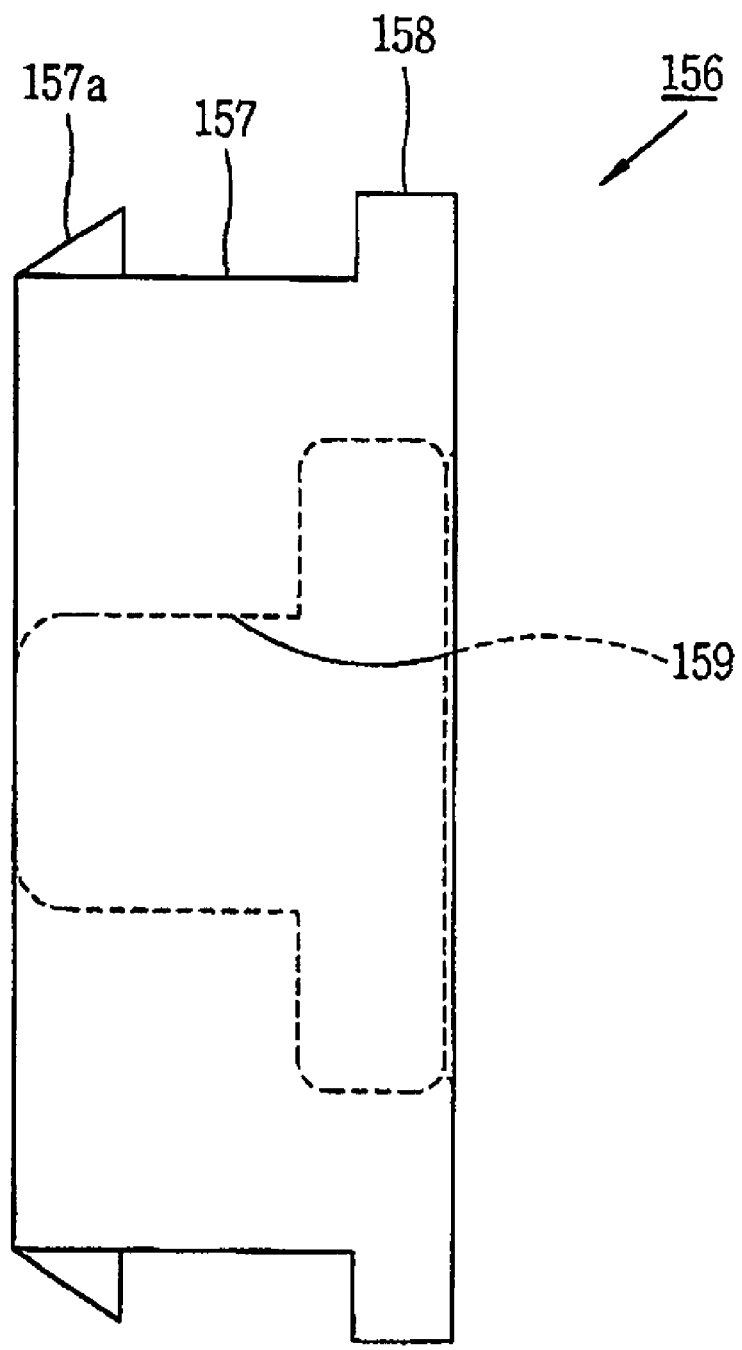
FIG. 5 is a sectional view showing a coupling member according to an embodiment of the present invention.

As shown in FIG. 6A and 6B, the electric conduction terminal 150 is inserted into the coupling member 156 that includes an insulating material such as plastic. As shown in FIG. 5, the coupling member 156 includes an accommodating part 157 inserted into the light source reflector 147, a flange part 158 provided on the other end with a size bigger than the size of the accommodating part 157, and a electric conduction terminal accommodating hole 159 provided on the inner part of the coupling member 156. The electric conduction terminal accommodating hole 159 is corresponding to the electric conduction terminal 150.

The accommodating part 157 is formed in a shape of the column, has a cross section of a circle, triangle, rectangular and so on. The second coupling part 175a is provided on the outside of the accommodating part 157 at the one end. As shown in FIG. 6A, the diameter d3 of the accommodating part 157 is almost same to the diameter d4 of the light source reflector 147 for coupling between the coupling member 156 and the light source reflector 147. The first coupling part 148 and the second coupling part 157a are coupled each other while the accommodating part 157 is inserted into the light source reflector 147 by pushing the accommodating part 157 to the light source reflector 147, thereby preventing the coupling member 156 from the light source reflector 147. Moreover, as shown in FIG. 6A, the distance d6 from the second coupling part 157a to the flange part 158 is almost same to the distance d5 from the first coupling part 148 to the one end of the light source reflector 147. Accordingly, the flange part 158 is supported by the one end of the light source reflector 147 when the coupling member 156 is coupling with the light source reflector 147.

The electric conduction terminal accommodating hole 159 is formed in a shape corresponding to the electric conduction terminal 150. There are no any patterns on the surface of the electric conduction terminal accommodating hole 159. In other words, the surface of the electric conduction terminal accommodating hole 159 may be featureless or plain. However, as shown in FIGS. 6A and 6B, the surface of the electric conduction terminal accommodating part 159 made of plastic that elastically deforms to engage with stoppers 155 when the electric conduction terminal 150 with stoppers 155 is inserted with a force into the electric conduction terminal accommodating hole 159. In other words, grooves are formed due to the elastic deformation of the surface of the electric conduction terminal accommodating hole 159 during the process of inserting the electric conduction terminal 150 into the electric conduction terminal accommodating hole 159. The electric conduction terminal 150 may be inserted into the electric conduction terminal accommodating hole 159 without difficulty due to the shape of the stoppers 155, but the electric conduction terminal 150 may not be easily disconnected from the electric conduction terminal accommodating hole 159 due to grooves formed to engage with the stoppers 155.

Alternatively, grooves may be pre-formed on the surface of the electric conduction terminal accommodating hole 159 to preventing the coupling member 156 from breaking during elastic deformation. Further, it is not difficult to couple the coupling member 156 with the electric conduction terminal 150 because stoppers 155 may be accommodated in the pre-formed grooves.

The light guide plate 160 is disposed under the liquid crystal display panel 120 and guides light entered into the light guide plate 160 to the rear of the liquid crystal display panel 120. The one side of the light guide plate 160 is close by the light source 140. The light guide plate 160 includes an entering side 161 that receives light from the light source body 141, an outgoing side 162 extended from the entering side 161 and facing the opposite of the liquid crystal display panel 120, and a rear side 163 having a pattern for guiding light entered into the entering side 161 to the outgoing side 162. Thus, the light guide plate 160 provides light from the light source body 141 for the liquid crystal display panel 120 with changing light entered into the entering side 161 into planar light.

As shown in FIG. 3, the light guide plate 160 may be a wedge type having the sloping rear side 163 and the horizontal outgoing side 162. In other words, the wedge type is formed that the cross section area tapers to become smaller in the direction away from the entering side 161 and toward another other end opposite the entering side 161. Even though not shown, the light guide plate 160 may be a plate type having the rear side 163 and outgoing side 162 provided horizontally each other. Generally, the wedge type of light guide plate 160 is used in small size of liquid crystal display device such as a display for a portable computer or a cell phone, while the plate type of the light guide plate 160 is used in larger sized of liquid crystal display device such as a liquid crystal television displays.

The reflective sheet 165 is disposed between the light source 140 and the lower cover 180, and provides the diffusion sheet 135 with light of the light source 140 through reflection. The reflective sheet 165 may include PET (polyethylene terephthalate) or PC (polycarbonate).

The lower cover 180 is coupled with the upper cover 110, and accommodating the liquid crystal display panel 120 and the backlight unit 170 in the interior space formed by the upper cover 110 and the lower cover 180. The lower cover 180 includes at least one of a lower cover exposing hole 181 exposing at least one part of a coupling member 156 and an electric conduction terminal 150. The lower cover exposing hole 181 and the upper cover exposing hole 111 are overlapped when the upper cover 110 and the lower cover 180 coupled each other.

The inverter 190 is disposed under the lower cover 180, provides power for the light source 140. The inverter 190 and the light source wire 145 are connected through the connector 146b.

Assembly method of the liquid crystal display device 100 according to the present invention is described in sequence as below.

First, the electric conduction terminal 150 shown in FIG. 4 is inserted into the coupling member 156 shown in FIG. 5. The electric conduction terminal 150 is inserted in the rear of the coupling member 156, and stoppers 155 is settled in grooves formed on the surface of the electric conduction terminal accommodating hole 159 through the pressure pushing the electric conduction terminal 150 as described above.

Afterwards, as shown in FIG. 6A, the coupling member 156 is inserted into the light source reflector 147. Therefore, the second coupling part 157a and the first coupling part 148 are coupled each other, and the light source electrode 143 is inserted into the electrode inserting cavity 154 as shown in FIG. 6d.

Thereafter, the upper cover 110 and the lower cover 180 are coupled each other so as to accommodating the liquid crystal display panel 120 and the backlight unit 170 in the inner part between the upper cover 110 and the lower cover 180. Therefore, the assembly of the liquid crystal display device 100 is completed as shown in FIG. 7.

In the next time, as shown in FIG. 6B, the coupling means 200 such as a screw is inserted into the connecting terminal ring-shaped, and the coupling means 200 is coupled with the coupling cavity of the electric conduction terminal 150. After that, as shown in FIG. 7, the connector 146b of the light source wire 145 is connected to the inverter 190.

As described above, the light source 140 and the light source wire 145 may be connected without the solder. The efficiency of the assembly process is improved because the light source 140 and the light source wire 145 may be connected through the insertion and coupling. Moreover, the connection between components is tightening securely, and the problems such as a malfunction caused by contaminant and disconnection caused by the impact is prevented because the soldering process is removed.

Another embodiment of the liquid crystal display device according to the present invention is described as below.

Features distinguished from the above embodiment in another embodiment may be described in detail below, and the descriptions of components identical to those described above are omitted.

Figure 8:
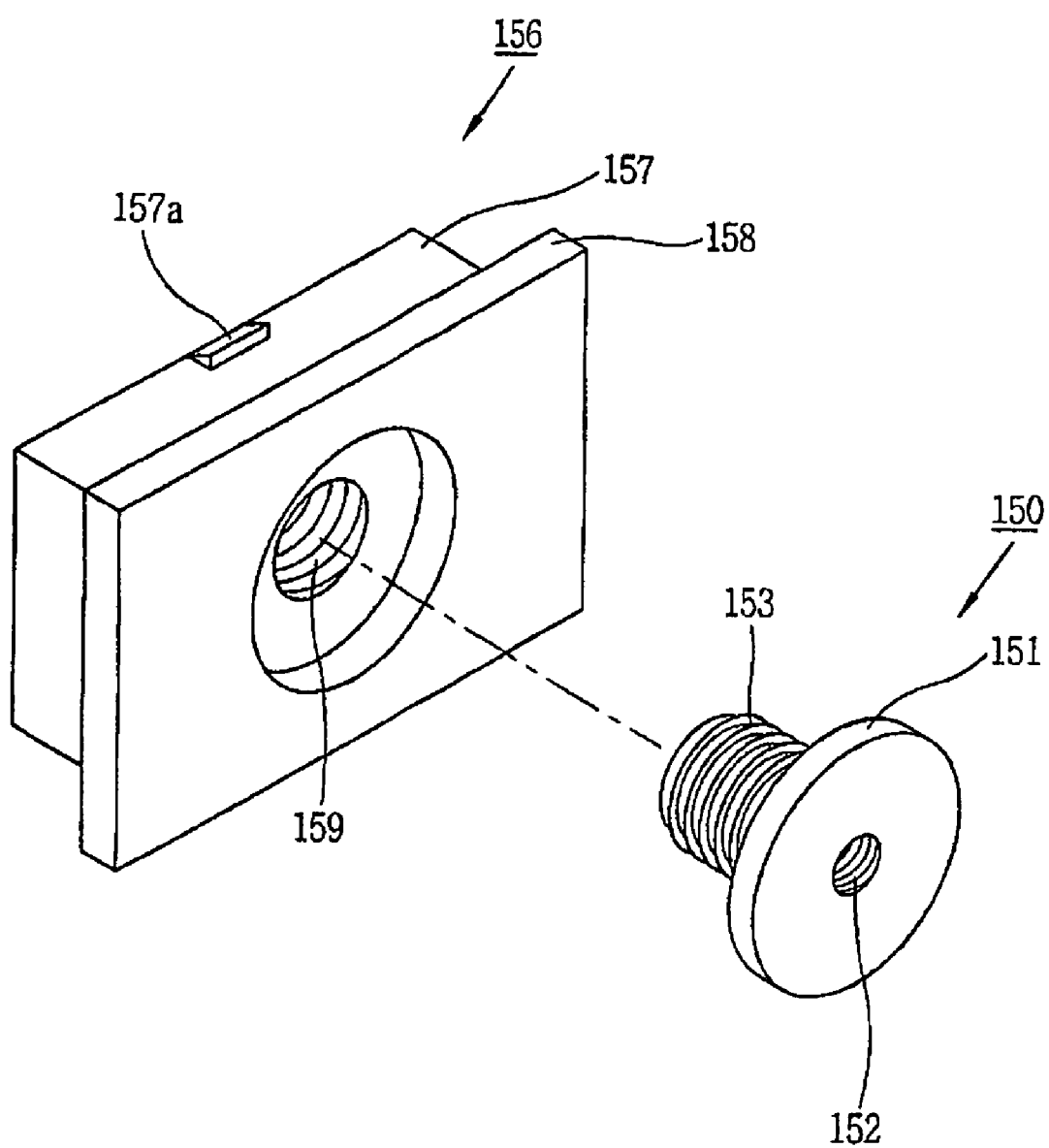
FIG. 8 is a perspective view illustrating another embodiment of a liquid crystal display device according to the present invention.

As shown in FIG. 8, the outside of the protrusion part 153 has a screw thread formed on. The inside of the electric conduction terminal accommodating hole 159 also has a screw thread formed on. The screw thread formed on the inside of the electric conduction terminal accommodating hole 159 and the outside of the protrusion part 153 is provided in a spiral. The terminal accommodating hole 159 and the protrusion part 153 are provided in the shape of the cylinder. Therefore, the protrusion part 153 may be inserted into the electric conduction terminal accommodating hole 159 without difficulty through rotary motion. The efficiency of the assembly process in the embodiment illustrated in FIG. 8 may be improved compared to the embodiments illustrated in FIGS. 6A and 6B.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device comprising:
   a liquid crystal display panel;
   a light guide plate;
   a light source providing light to a rear surface of the liquid crystal display panel comprising: a light source body in the shape of a cylinder having a light source electrode disposed at each of two ends of the light source body, wherein the light source body is disposed at a lateral side of the light guide plate;
   an inverter providing power for the light source;
   a light source wire connected between the inverter and the light source electrodes, and having a connecting terminal with a ring shaped portion at one end of the light source wire;
   an electric conduction terminal having an electrode inserting cavity for accommodating the light source electrode at a first end and a coupling cavity for coupling with a coupling means passing through the connecting terminal ring-shaped portion at second end opposite the first end, so that the electric conduction terminal connects between the light source electrode at a first end and the light source wire with the connecting terminal at the second end;
   a light source reflector formed along the light source body and covered a part of a circumference of the light source body, wherein the light source reflector has at least one first coupling part dent-shaped on an inside at the both ends of the light source reflector; and a coupling member having a electric conduction terminal accommodating hole exposing the electrode inserting cavity and the coupling cavity of the electric conduction terminal and coupling to the electric conduction terminal, wherein the coupling member is formed of an insulating material and wherein the coupling member comprises an accommodating part inserted into the light source reflector, a second coupling part provided on the outside of the accommodating part at the one end and preventing the coupling member form being separated form the light source reflector through coupling with the first coupling part, and a flange part provided on the other end of the accommodating part opposite the second coupling part and supported by an end of the light source reflector when the accommodating part is inserted into the light source reflector.

2. The liquid crystal display device according to claim 1, wherein the electric conduction terminal comprises a main body and a protrusion part projected from the main body, wherein the electrode inserting cavity is provided on the protrusion and the coupling cavity is provided on the main body.

3. The liquid crystal display device according to claim 2, wherein the protrusion part has a plurality of stoppers formed on an external circumference thereof.

4. The liquid crystal display device according to claim 3, wherein the electric conduction terminal accommodating hole has a plurality of grooves on an interior surface for coupling with stoppers.

5. The liquid crystal display device according to claim 2, wherein the main body and the protrusion are formed in the shape of cylinders, and wherein an external surface of the protrusion and an interior surface of the electric conduction terminal accommodating hole each have a screw thread formed thereon.

6. The liquid crystal display device according to claim 1, wherein the connecting terminal and the coupling means are conductive, wherein the coupling means includes a screw, and wherein the coupling cavity has a screw thread formed on an interior surface of the coupling cavity.

7. The liquid crystal display device according to claim 1, wherein the electric conduction terminal accommodating hole is formed into a shape corresponding to a shape of the electric conduction terminal, and wherein the electric conduction terminal is inserted rearward of the flange part.

8. The liquid crystal display device according to claim 1, further comprising:

an upper cover and a lower cover accommodating the liquid crystal display panel, the light source, the electric conduction terminal and the coupling member between the upper cover and the lower cover coupled each other;

an upper cover exposing hole provided on the side of the upper cover; and a lower cover exposing hole is provided on the side of the lower cover, the upper cover exposing hole and lower cover exposing hole each exposing at least one part of the electric conduction terminal and the coupling member.

* * * * *